Oct. 11, 1927.
C. T. SCOTT
1,645,027
DUST CAP AND RIM NUT CONNECTION FOR TIRE VALVE STEMS
Filed Oct. 2, 1926
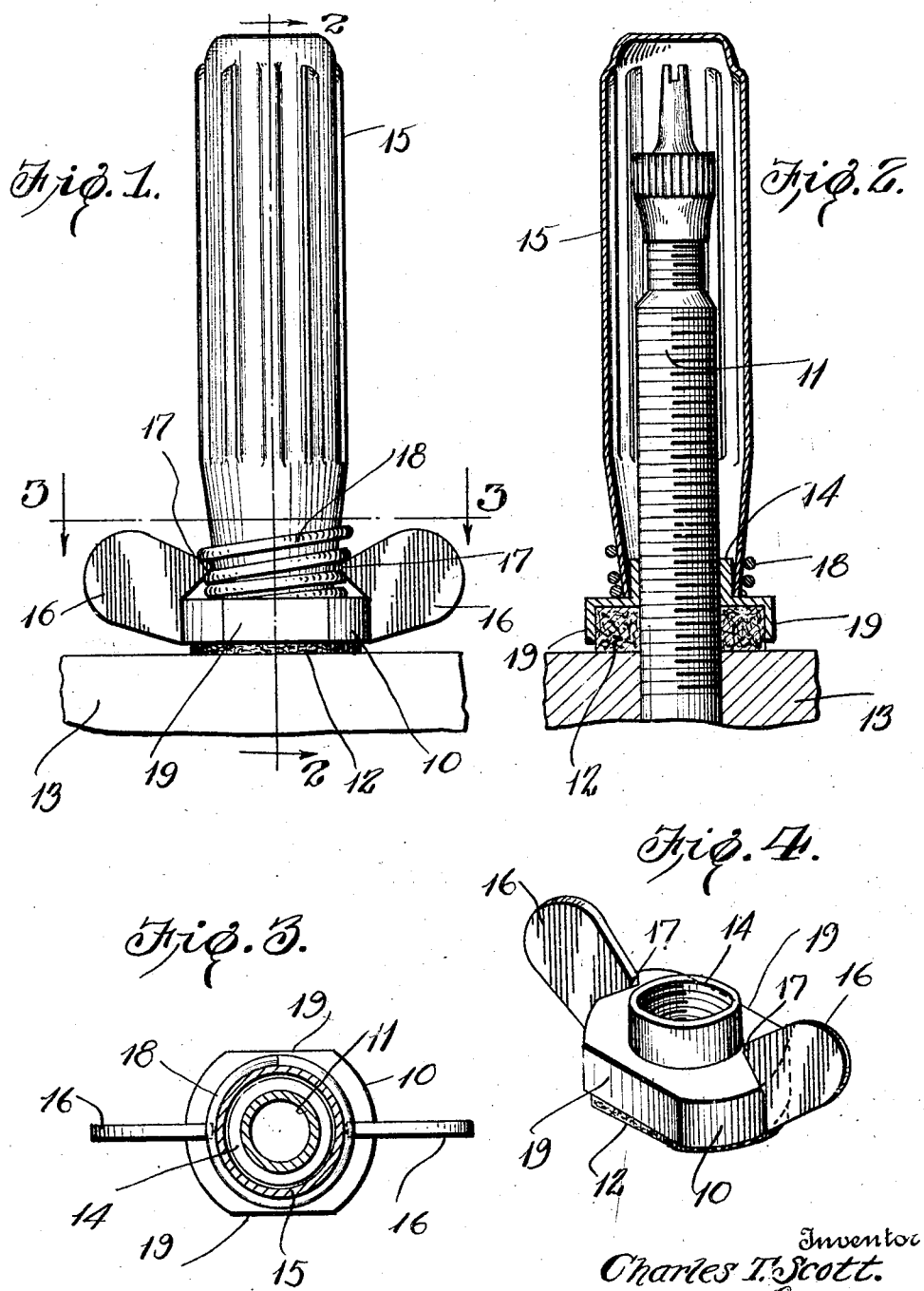
Inventor
Charles T. Scott.
Attorney Patented Oct. 11, 1927.

1,645,027

UNITED STATES PATENT OFFICE.

CHARLES T. SCOTT, OF UPPERVILLE, VIRGINIA.

DUST CAP AND RIM NUT CONNECTION FOR TIRE-VALVE STEMS.

Application filed October 2, 1926. Serial No. 139,119.

This invention relates in general to pneumatic tires for vehicles such as automobiles, trucks and, in fact, all vehicles employing pneumatic tired wheels.

Such tires are almost universally provided with a valve stem which projects through the rim and felloe of the wheel and the invention particularly relates to a dust cap and rim nut connection for tire valves.

In the usual construction the valve is threaded externally and a rim nut is screwed on this threaded portion to hold the valve in position. Generally this nut is hexagonal and requires the use of tools to remove it in changing tires. Also a dust cap is provided which usually has the mouth portion internally threaded to engage a threaded boss on the nut.

One object of the present invention is to provide a novel arrangement of rim nut having both wings for finger engagement and flats for tool (wrench) engagement.

A second important object of the invention is to provide a novel form of dust cap wherein the cap is screw engageable with the nut, the screw thread on the cap being formed in a novel manner, of a spiral of spring wire.

A third important object of the invention is to provide a novel combination of such a dust cap with a wing nut having its wings formed to engage the screw threads.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a partial side view illustrating the particular application of my invention.

Figure 2 is a vertical cross section taken on line 2—2 of Figure 1.

Figure 3 is a detail section taken on line 3—3 of Figure 1.

Figure 4 is a detail perspective view of the rim nut removed.

Referring now to these figures, my invention proposes an arrangement wherein a rim nut 10 is provided as usual with internal threads to engage a threaded valve casing 11 and is also provided with a counterbore to receive a leather or other washer 12 adapted to abut the surface of a felloe or rim 13 around the base of the valve 11. This nut has an upstanding tubular portion 14, adapted to act as a guide for the lower open end of the dust cap 15, unthreaded upon its external surface and otherwise unconnected to the dust cap.

In further accordance with my invention the dust cap 15 is formed without the usual internal threads at its open end since it is not intended to engage external threads on the upstanding tubular portion of the rim nut as is the present practice.

In order to permit of engagement of the dust cap 15 with the rim nut in such manner as to avoid the tendency of these parts gripping together sufficiently tight to turn the rim nut by rotating the dust cap, I form the rim nut 10 with diametrically opposed upstanding and outstanding side wings 16, as best shown in Figures 1 and 4. These wings provide means by which the rim nut may be turned by hand into tight engagement with the adjacent surface of the felloe or rim 15. These wings are so shaped as to present inwardly projecting opposing lugs 17 in spaced relation. These lugs are adapted to engage the convolutions of a spring 18 loosely coiled around the external surface of the dust cap 15 near its open end. This spring is connected, as by solder or in any other suitable manner to the dust cap at one or more points, the remaining portions of the spring being free so that the convolutions may yield relative to one another. The spring, in practice, acts in effect like a thread in engagement with the lug 17 of the nut wings, although it is capable of compressing when the dust cap is turned tight in connection with the rim nut so that a certain degree of tension is created which will serve to effectively prevent accidental displacement of the dust cap. The connection formed in this manner is not, however, as resistant as the connection of the rim nut 10 when the latter is turned firmly into engagement with the adjacent surface of a felloe or rim 13 and consequently when it is desired to move the cap 15 there is little, if any danger of unscrewing the rim nut 12.

Preferably only the extremity of the spring at the mouth of the dust cap is secured to such cap but I do not restrict myself to this as I may connect the spring at any other desired point or points, it being only requisite that the spring shall yield longitudinally so as to be placed under tension when the cap is screwed home.

While the wings 16 form means by which the rim nut may be effectively turned into tight engagement with the adjacent surface of the felloe or rim, the rim nut may have diametrically opposed flat wrench engaging faces 19, or may, if so desired, be formed in the first instance in the shape of a hexagon as is commonly practiced.

I claim:—

1. In combination, a rim nut having upstanding and outstanding diametrically opposed wings, presenting inwardly and oppositely facing spaced lugs, and a dust cap adapted to set at its open end against the rim nut and provided around its open end with a spring, the spring being secured at least one point to the cap and having the remaining portions of its convolutions free, said spring being arranged for engagement as a thread with the said lugs.

2. In combination, a rim nut having upstanding and outstanding diametrically opposed spaced wings having oppositely facing spaced and confronting lugs, and a dust cap adapted to set at its open end against the rim nut and provided around its open end with a spring, the spring being secured at one terminal to the cap and having the remaining portions of its convolutions free for engagement as a thread with the said lugs, the said rim nut having a reduced upstanding tubular portion forming a guide for the open end of the dust cap and with respect to which the latter is freely movable.

In testimony whereof I affix my signature.

CHARLES T. SCOTT.